(12) United States Patent
Ohishi et al.

(10) Patent No.: US 6,979,063 B2
(45) Date of Patent: Dec. 27, 2005

(54) BRAKE LIQUID PRESSURE CONTROL UNIT OF ON-VEHICLE DEVICE AND ITS MANUFACTURING METHOD

(75) Inventors: Yuji Ohishi, Kanagawa (JP); Hikaru Morita, Kanagawa (JP); Chiharu Nakazawa, Kawasaki (JP); Daisuke Hiwatashi, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/127,696

(22) Filed: Apr. 23, 2002

(65) Prior Publication Data

US 2002/0171287 A1 Nov. 21, 2002

(30) Foreign Application Priority Data

Apr. 25, 2001 (JP) ........................................ 2001-127591
Mar. 8, 2002 (JP) ........................................ 2002-062777

(51) Int. Cl.⁷ ................................................ B60T 8/36
(52) U.S. Cl. .............................. 303/119.3; 303/DIG. 10
(58) Field of Search ........................ 303/119.3, DIG. 10, 303/DIG. 11

(56) References Cited

U.S. PATENT DOCUMENTS

| | | | | |
|---|---|---|---|---|
| 5,244,262 A | * | 9/1993 | Kehl et al. ................ | 303/119.3 |
| 5,324,134 A | | 6/1994 | Kaes et al. | |
| 5,460,350 A | | 10/1995 | Nagashima et al. | |
| 5,460,438 A | * | 10/1995 | Hellmann et al. ........ | 303/119.3 |
| 5,540,486 A | | 7/1996 | Linkner | |
| 5,577,813 A | * | 11/1996 | Zaviska .................... | 303/116.4 |
| 5,718,489 A | | 2/1998 | Megerle et al. | |
| 5,857,753 A | * | 1/1999 | Gowda ..................... | 303/116.4 |
| 6,102,495 A | * | 8/2000 | Zaviska .................... | 303/116.4 |
| 6,145,543 A | * | 11/2000 | Ohishi et al. ............. | 137/884 |
| 6,223,647 B1 | | 5/2001 | Plantan et al. | |
| 6,270,170 B1 | * | 8/2001 | Isogai et al. ............. | 303/119.3 |
| 6,360,778 B1 | * | 3/2002 | Vennemeyer et al. .... | 138/31 |
| 6,390,133 B1 | * | 5/2002 | Patterson et al. ......... | 138/31 |
| 6,398,315 B1 | | 6/2002 | Dinkel et al. | |
| 6,472,769 B1 | | 10/2002 | Long, Jr. et al. | |
| 6,536,983 B1 | | 3/2003 | Morefield | |
| 2002/0140284 A1 | | 10/2002 | Koyama | |
| 2002/0171286 A1 | | 11/2002 | Ohishi et al. | |

FOREIGN PATENT DOCUMENTS

| | | |
|---|---|---|
| JP | 11-139285 A | 5/1999 |
| JP | 11-321608 A | 11/1999 |
| JP | 2001-328526 A | 11/2001 |
| JP | 2001-523611 A | 11/2001 |
| JP | 2002-200972 A | 7/2002 |
| JP | 2002-283988 A | 10/2002 |
| WO | 99/25594 | 5/1999 |

* cited by examiner

*Primary Examiner*—Robert A. Siconolfi
(74) *Attorney, Agent, or Firm*—Foley & Lardner LLP

(57) ABSTRACT

In brake liquid pressure control unit for an on-vehicle device and its manufacturing method, a lid member constituting at least one reservoir together with a cylindrically shaped hole is formed substantially in a bell shape, the lid member comprising a cylindrical wall projected externally from one of four base surfaces expect mutually opposing first and second base surface of a base block of a rectangular parallelopiped on which the cylindrically shaped hole is formed.

29 Claims, 12 Drawing Sheets

BRAKE LIQUID PRESSURE CONTROL UNIT OF ON-VEHICLE DEVICE AND ITS MANUFACTURING METHOD

BACKGROUND OF THE INVENTION

1. Field of the Invention

The present invention relates to a brake liquid pressure control unit of an on-vehicle device including a control mechanism in a brake system such as an anti-lock brake system (ABS), a vehicular motion control system, a traction control system and its manufacturing method.

2. Description of the Related Art

Such a kind of brake liquid pressure control unit as described above is exemplified by an international patent application publication official gazette No. WO99/25594 published on May 27, 1999.

The previously proposed brake liquid pressure control unit as disclosed in the above-described publication, a liquid pressure circuit including a liquid pressure device such as a pump is disposed on a base block in substantially a rectangular parallelepiped formed of an aluminum material. A pump driving motor and an electronic circuit board block to control an electromagnetic valve or another electronic device are attached onto two surfaces, i.e., a first base surface and a second base surface which faces against each other in mutually opposing direction.

In addition, a reservoir in which a piston and bias device are housed is disposed with a space enclosed by a cylindrically shaped hole and a lid member. The reservoir temporarily reserves a working liquid (brake liquid) within the liquid pressure circuit. The cylindrical hole of the reservoir is formed on the second base surface on which the electronic circuit board block is attached and the lid member attached onto an opening end of the cylindrically shaped hole is projected into a covering of the electronic circuit board block.

SUMMARY OF THE INVENTION

It is desirable that, in such a kind of the brake liquid pressure control unit, the whole unit needs to be designed as compact as possible since the brake liquid pressure control unit is arranged within a limited space of an automotive vehicle. However, since the reservoir is attached onto the same second base surface as the electronic circuit board block, a width of the whole brake liquid pressure control unit becomes unavoidably large. Hence, it is difficult to improve a vehicular mounting ability. That is to say, if the cylindrically shaped hole formed on the base block is made deeper, the width of the base block itself is unavoidably needed to be wider. To avoid this, if a height of the projected part of the lid member is increased, it becomes unavoidably necessary to increase the height of the electronic circuit board block in order to avoid an interference between the circuit board in the electronic circuit block and other parts.

It is, hence, an object of the present invention to provide a brake liquid pressure control unit on an on-vehicle device and its manufacturing method in which a width of a base block on which a motor and an electronic circuit block are disposed is narrowed and, while the whole base block is maintained to be compact, a reservoir can be arranged on the same base block so that a vehicular mounting ability is superior.

According to one aspect of the present invention, there is provided a brake liquid pressure control unit for an on-vehicle device, comprising: a base block in a substantially rectangular parallelopiped; at least one reservoir disposed on the base block to temporarily reserve a working liquid in a liquid pressure circuit; a motor to operate a pump to supply the working liquid: an electronic printed circuit board block to control at least an electromagnetic valve, the motor and electronic printed circuit board block being attached onto mutually opposing first and second base surfaces of the base block, respectively; a cylindrically shaped hole formed on one of four base surfaces of the base block except the first and second base surfaces; and a lid member constituting the reservoir together with the cylindrically shaped hole and formed substantially in a bell shape, the lid member comprising a cylindrical wall projected externally from the four base surfaces of the base block on which the cylindrically shaped hole is formed.

According to another aspect of the present invention, there is provided a manufacturing method of a brake liquid pressure control unit for an on-vehicle device, the brake liquid pressure control unit comprising: a base block in a substantially rectangular parallelopiped; at least one reservoir disposed on the base block to temporarily reserve a working liquid in a liquid pressure circuit; a motor to operate a pump to supply the working liquid: an electronic printed circuit board block to control at least an electromagnetic valve, the motor and electronic printed circuit board block being attached onto mutually opposing first and second base surfaces of the base block, respectively; a cylindrically shaped hole formed on one of four base surfaces of the base block except the first and second base surfaces; and a lid member constituting the reservoir together with the cylindrically shaped hole and formed substantially in an inverted bell shape, the lid member comprising a cylindrical wall projected externally from the four base surfaces of the base block on which the cylindrically shaped hole is formed, further comprising a plurality of approximately arc shaped engagement portions to engageably retain the lid member thereon by performing a partial staking of an opening edge of the cylindrically shaped hole along an outer periphery of the lid member, the method comprising: forming a ring-shaped concave shaped step portion to dispose the lid member on the opening end portion of the cylindrically shaped hole of the base block; preparing a punch having a plurality of pressure applying projections on an outer periphery thereof, each pressure applying projection having an arc surface of a larger radius of curvature than an inner peripheral surface of the concave formed step portion; and performing the partial staking simultaneously on the upper edge of the concave shaped step portion by means of the plurality of punches after the lid member is arranged on the concave shaped step portion.

This summary of the invention does not necessarily describe all necessary features so that the invention may also be a sub-combination of these described features.

DETAILED DESCRIPTION OF THE PREFERRED EMBODIMENTS

Figure 1:
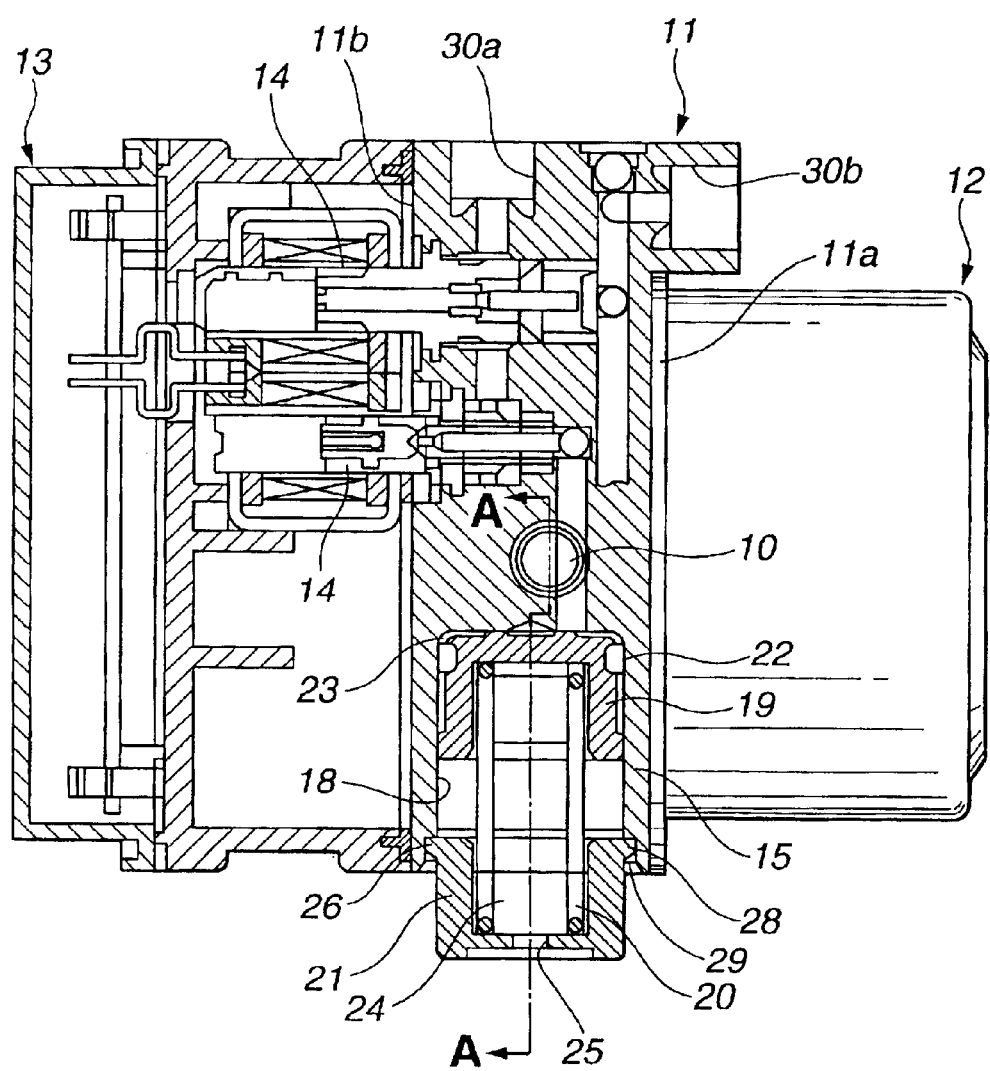
FIG. 1 is a longitudinal cross section view of a brake liquid pressure control unit in a first preferred embodiment according to the present invention.

Reference will hereinafter be made to the drawings in order to facilitate a better understanding of the present invention.

FIGS. 1 through 13 show a first preferred embodiment of a brake liquid pressure control unit for a on-vehicle device according to the present invention.

In the first embodiment, the on-vehicle device is a control system to control a vehicular brake system, for example, an anti-lock brake system (ABS). The brake liquid pressure control unit (or hereinafter, also referred to as a liquid pressure control unit) includes: a base block of a rectangular parallelepiped on which a liquid pressure circuit including various kinds of liquid pressure devices such as a working liquid supplying pump 10 is mounted; and a pump driving purpose motor 12 and an electronic printed circuit board block 13 to control electronic equipment including the electromagnetic valve attached on a first base surface 11a and a second base surface 11b, both surfaces 11a and 11b of base block 11 being faced against each other in a mutually opposite direction.

Figure 2:
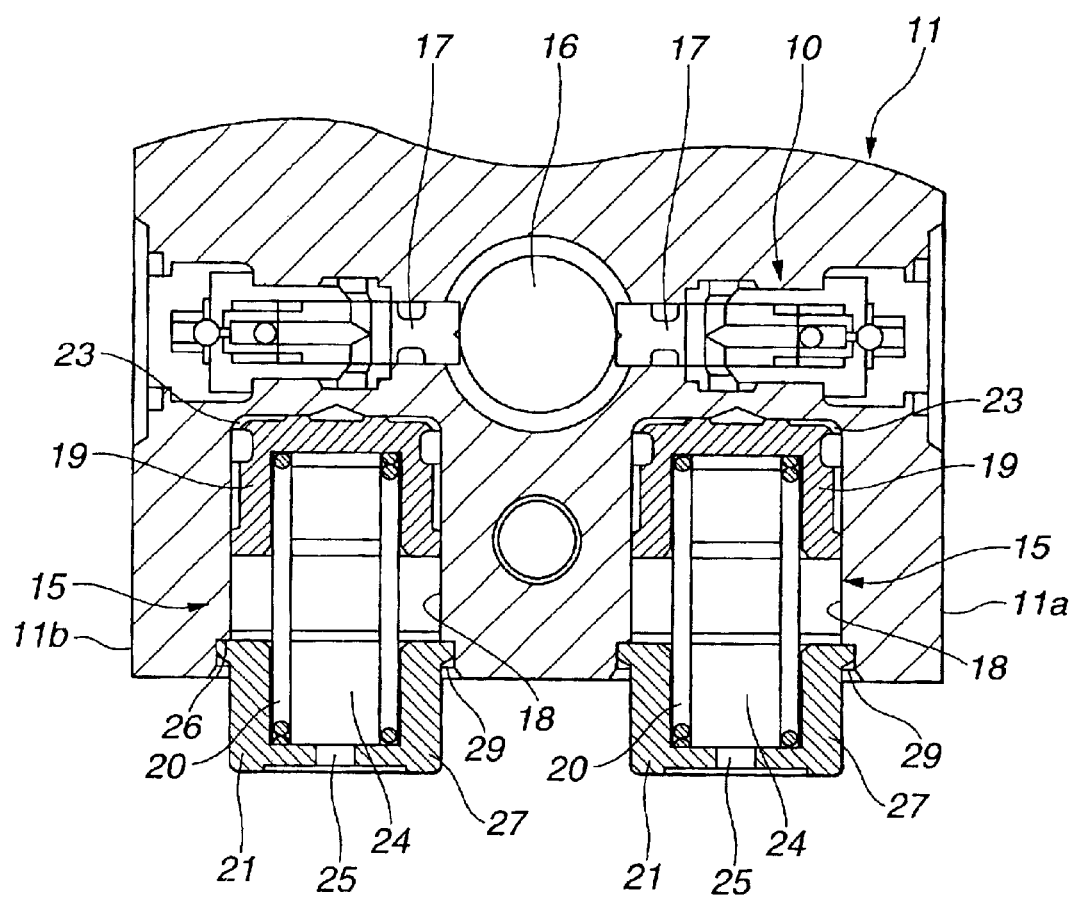
FIG. 2 is a cross section view cut away along a line A—A shown in FIG. 1.

A distribution tube connected to a master cylinder and a distribution tube connected to each wheel cylinder are connected together at base block 11 so that a liquid pressure of the liquid pressure circuit of a corresponding one of the wheel cylinders is properly controlled by means of a liquid pressure circuit within base block 11. Specifically, in the liquid pressure control unit, an electromagnetic valve 14 interposed between the base block 11 and the electronic printed circuit board block 13 serves to open or close a passage within the liquid pressure control circuit so that a pressure within any one of the wheel cylinders is in anyone of pressure decrease state, pressure retaining state, or re-increase in pressure state in accordance with a corresponding vehicular wheel slip condition. In addition, a pair of reservoirs 15 are disposed within the liquid pressure circuit of base block 11 to retain temporarily a working liquid therein. An operation of a liquid pressure pump 10 causes the working liquid in each reservoir 15 to be returned to the master cylinder. In the first embodiment, the pump 10 is constituted by a plunger pump as shown in FIG. 2. An eccentric cam 16 operates a plurality of plungers 17 in a reciprocative manner so that the pump 10 is operated.

Figure 3:
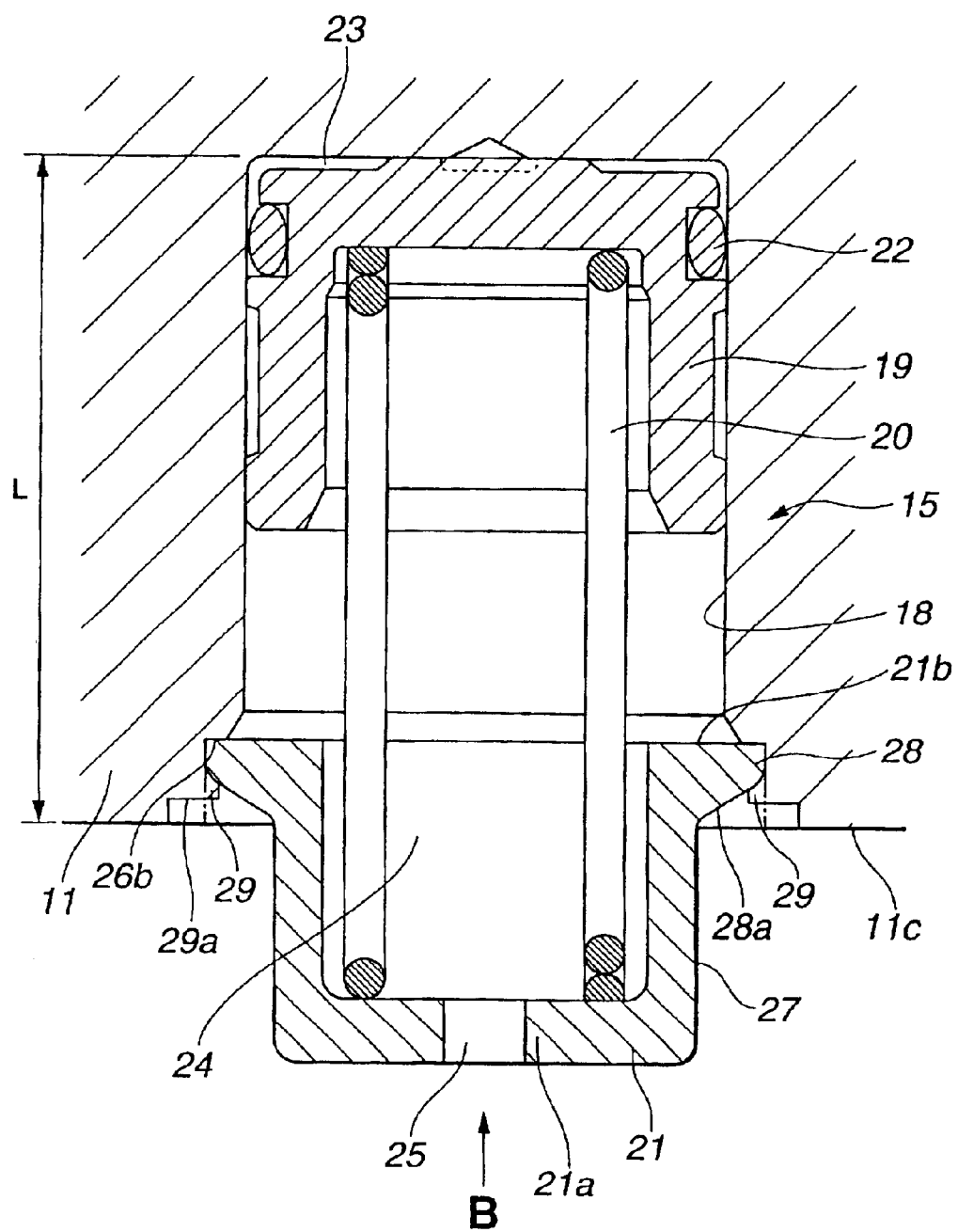
FIG. 3 is an expanded cross section view of a reservoir shown in FIG. 2.

Base block 11 is formed wholly of an aluminum material and designed so that an upper surface as viewed from FIG. 1 corresponds to the upper surface when the brake control unit shown in FIG. 1 is mounted in a vehicle body. It is noted that a pair of cylindrically shaped holed 18 and 18 are aligned on a lower surface of base block 11 in a direction perpendicular to a width direction of first and second base surfaces 11a and 11b. A piston 19 slidably moves within each of the cylindrically shaped holes 18 and 18 as shown in FIGS. 1 to 3. A coil spring 20 is housed within each cylindrically shaped hole 18 which is a biasing device to bias the piston 19 in the direction toward a bottom of the corresponding cylindrically shaped hole 18. A lid member 21 formed of the same aluminum material as base block 11 is attached around an opening edge of each cylindrically shaped hole 18 and 18.

A seal ring 22 is attached on an outer periphery of piston 19 within each cylindrically shaped hole 18 and 18 so that a space sandwiched between the corresponding cylindrically shaped hole 18 and lid member 21 is partitioned into a liquid chamber 23 and an atmospheric air chamber 24. Liquid chamber 23 positioned at the bottom side of corresponding cylindrically shaped hole 18 is connected to a passage (not shown) within the liquid pressure circuit and the atmospheric air chamber 24 is communicated with an external of the unit via a ventilation hole 25 formed on the bottom surface of each lid member 21.

A concave formed step portion 26 is formed in a circular ring shape around of each cylindrically shaped hole 18. Corresponding member 21 is tightly contacted with and fixed on the bottom surface of concave formed step portion 26 by means of a fixing device. Lid member 21 is formed wholly in an cylinder having an inverted bell shaped bottom end and a flange 28 is extended toward an end of a cylinder wall 27 formed on each lid member 21. Each cylinder wall 27 is projected from the lower surface of base block 11 under a state in which cylindrical wall 27 is fixed onto the concave formed step portion 26.

Each flange 28 has its outer diameter slightly smaller than an inner diameter of concave formed step portion 26 and is formed with a tapered surface 28a (refer to FIG. 3) which becomes tapered as the upper surface becomes a thinner as flange 28 goes to a tip end of the outer periphery of flange 28. An outer peripheral edge portion of flange 28 is extended toward its outside than the diameter of corresponding cylindrically shaped hole 18 and is contacted with the bottom surface of the concave formed step portion 26. An inner peripheral edge of flange 28 is positioned at an more inner side in a diameter direction than an inner peripheral surface of corresponding cylindrically shaped hole 18. Each cylinder wall 27 contacted with flange 28 has a smaller diameter than the diameter of corresponding cylindrically shaped hole 18.

Hence, an inner peripheral edge portion of corresponding flange 28 is faced against an end surface of corresponding piston 19. When piston 19 is lowered by a preset stroke or more, the inner peripheral edge portion thereof is brought in contact with piston 19 so as to limit an excessive displacement of the same piston 19.

Figure 4:
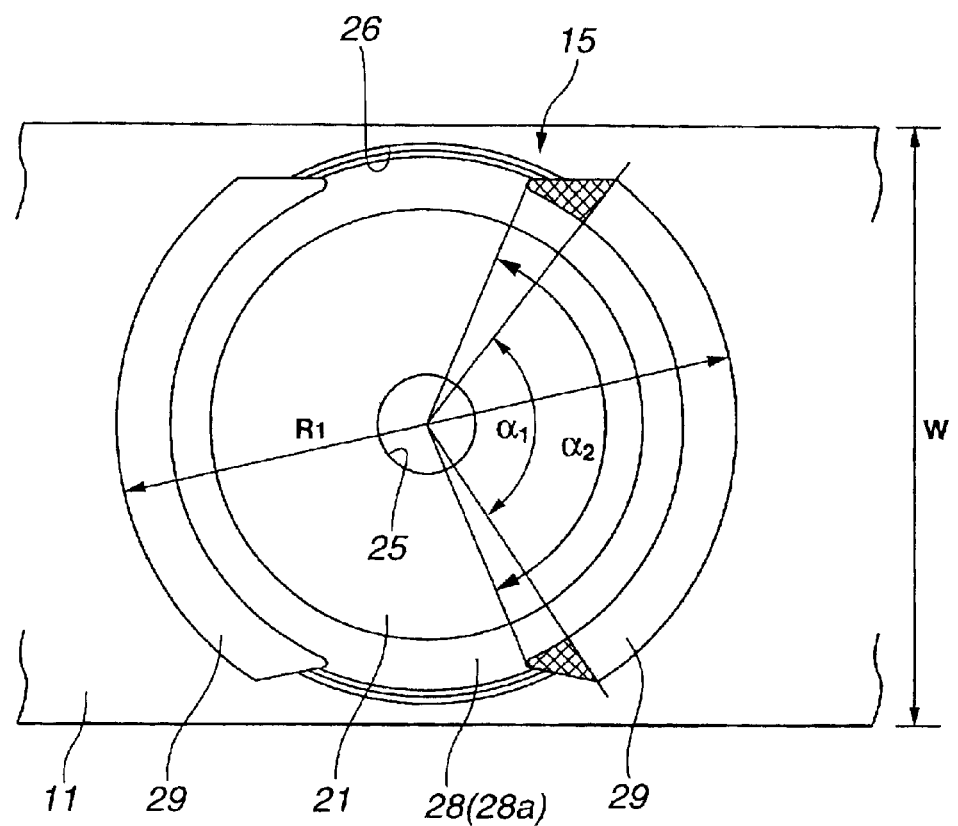
FIG. 4 is an arrow marked directional view of B shown in FIG. 3.

It is noted that each flange 28 of respective lid members 21 is fixed by means of a pair of engagement portions 29 (plastically deformation portion) extended along an upper edge of corresponding concave formed step portion 26 as shown in FIGS. 3 and 4.

Each engagement portion 29 is formed by performing a partial staking for the upper edge of concave formed step portion 26 as shown in FIGS. 3 and 4 and the whole shape of each engagement portion 29 is of a sector shape in a plan view as shown in FIG. 4. In addition, both engagement portions 29 for two lid members 21 are formed on surface regions of peripheral edge portions of the concave formed step portions 26 except the vicinity regions around first and second base surfaces 11$a$ and 11$b$.

Figure 5:
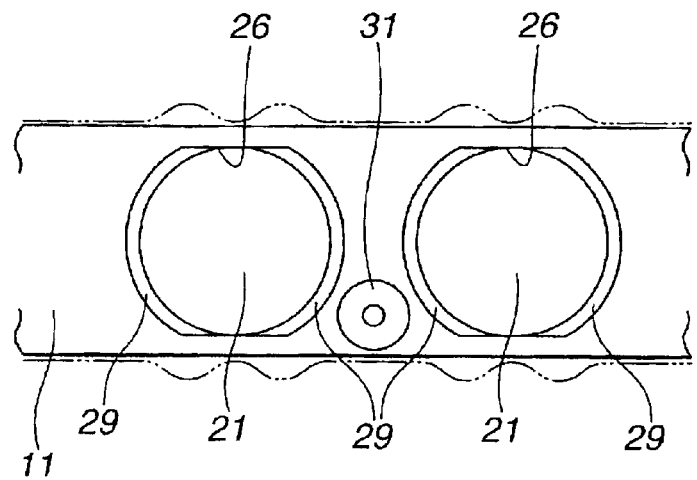
FIG. 5 is a rear surface view of a base block in the first embodiment shown in FIG. 1.

An end portion of each engagement portion 29 in a circumferential direction is formed so as to be parallel to the first and second base surfaces 11$a$ and 11$b$, as shown in FIGS. 4 and 5. Hence, end edges of each engagement section 29 in a circumferential direction are formed so that an a center angle $\alpha_2$ with respect to an arc in an inner region in a radial direction of each corresponding engagement portion 29 is larger (wider) than another center angle $\alpha_1$ with respect to another arc in a maximum outer diameter portion of its engagement portion 29.

Furthermore, in each engagement portion 29, a virtual circle diameter $R_1$ constituting an arc at a maximum outer diameter portion of each corresponding engagement portion 29 is set to be larger than a width W between the first and second base surfaces 11$a$ and 11$b$ (hereinafter, called a width W of base block 11) (refer to FIG. 4).

Plug connecting mouths 30$a$ and 30$b$ are disposed in the vicinities of the upper surface of base block 11 and the upper end of first base surface 11$a$. Distribution tube connection plugs are to be attached onto these connecting mouths 30$a$ and 30$b$.

In addition, a reference numeral 31 shown in FIG. 5 denotes an insulator rubber which performs a vibration preventing function, when base block 11 is mounted in an engine compartment of the vehicle, and which is interposed between the pair of reservoirs 15 and 15 on the bottom surface of base block 11.

Figure 6:
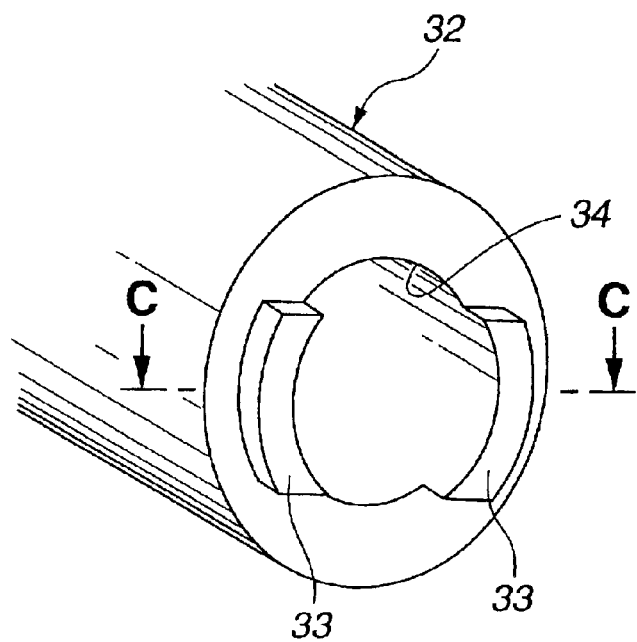
FIG. 6 is a perspective view of a punch for staking in the first embodiment shown in FIG. 1
Figure 7:
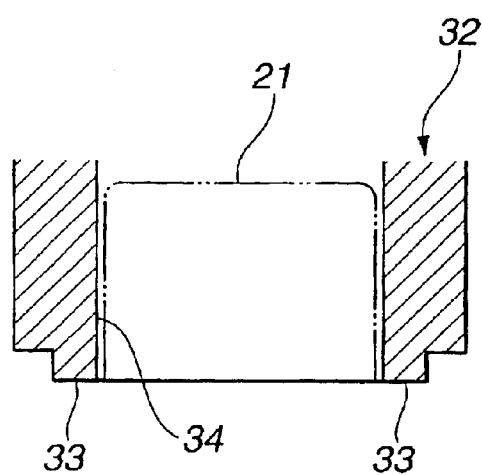
FIG. 7 is a cross section view cut away along a line C—C in FIG. 6.

A punch 32 is used to perform the partial staking on the upper edge of the concave formed step portion 26, as shown in FIGS. 6 and 7. The punch 32 is provided with a pair of arc-shaped pressure applying projections 33 and 33 at its tip portion. A spill port 34 in a circular shape is formed on insides of the respective pressure applying projections 33 and 33 to spill cylindrical wall 27 of the lid member 21 during the staking. Whole pressure applying projections 33 are formed with substantially constant width. The end edges in these circumferential directions of projections 33 and 33 are formed in parallel to the first and second base surfaces 11$a$ and 11$b$ of base block 11 in the same way as each engagement portion 29.

It is noted that each pressure applying projection 33 serves to stake the upper edge of the concave formed step portion 26 of base block 11 and a radius of curvature on an arc surface of an outer periphery of the pressure applying projections 33 is set to be larger than the radius of curvature of an inner peripheral surface of the concave formed step portion 26.

Figure 8:
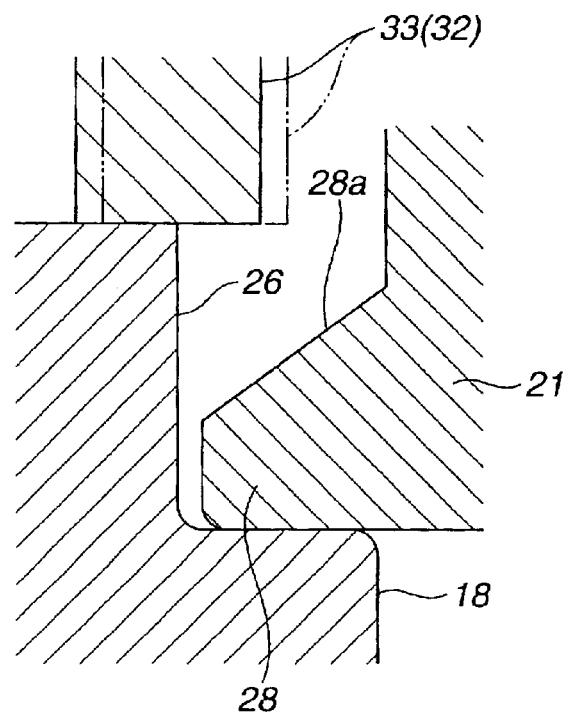
FIG. 8 is an expanded cross section view for explaining a state before the staking in the first embodiment shown in FIG. 1.
Figure 9:
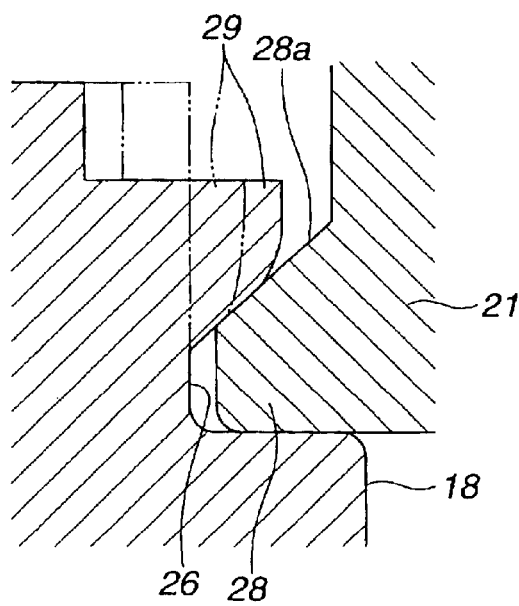
FIG. 9 is an expanded cross section view for explaining a state after the staking in the first embodiment shown in FIG. 1.

When the staking is performed using punch 32, corresponding lid member 21 is, at first, mounted on the bottom surface of concave formed step portion 26 of base block 11 as shown in FIG. 8. In this state, two pressure applying projections 33 and 33 of punch 32 are simultaneously pressed on predetermined positions of the upper edge of concave formed step portion 26, the upper edge of concave formed step portion 26 is plastically deformed along an end surface shape (profile) of pressure applying projections 33 so that each engagement portion 29 is formed so as to press a tapered surface 28$a$ of corresponding flange 28 as shown in FIG. 9.

The partial staking on the upper edge of concave formed step portion 26 is performed by such a method as described above so that an inferior goods having large stake errors can easily be sorted by using image processing method. Such a sorting as described above will be described above. Such a staking error as described above occurs when the position of the pressure applying projections 33 of the punch 32 is largely deviated from a prescribed position as denoted by a phantom line shown in FIG. 8.

When the staking is carried out under such a deviated state as described above, an extrusion quantity of the material due to the plastic deformation becomes insufficient so that a sufficient pressing strength to corresponding flange 28 of lid member 21 cannot be obtained as denoted by the phantom line shown in FIG. 8. Hence, it is necessary to sort a product whose press strength is insufficient as an inferior good. On the other hand, the inferior good of the products in which the partial staking is carried out can be sorted as described above.

Figure 10:
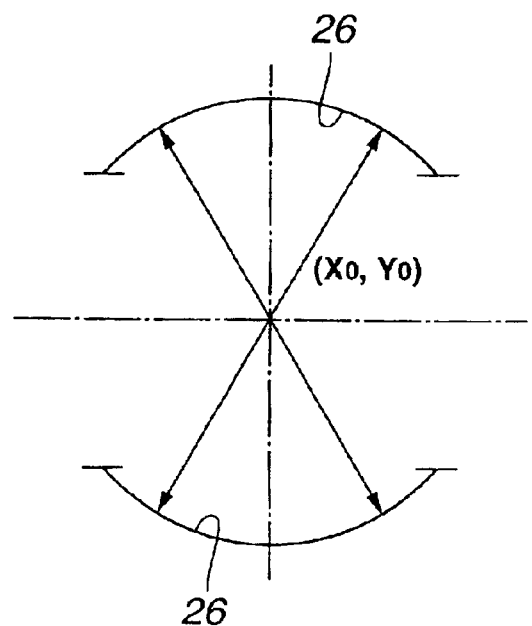
FIG. 10 is a model view for explaining a method of determining a staking error in the first embodiment shown in FIG. 1.
Figure 11:
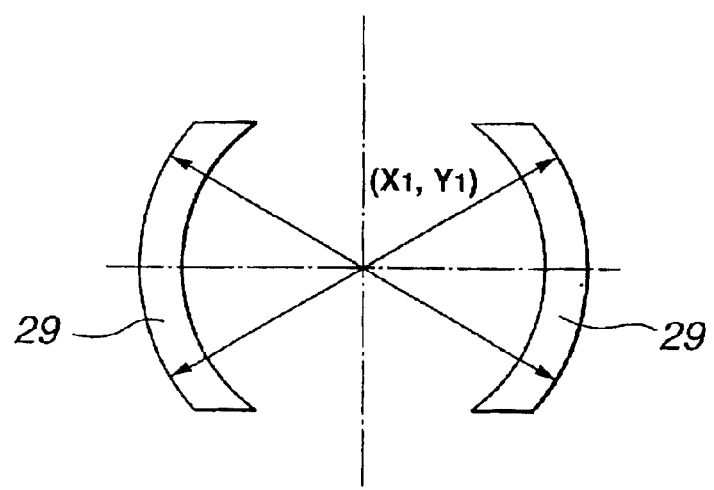
FIG. 11 is a mode view for explaining the method of determining the staking error in the first embodiment shown in FIG. 1.

That is to say, in a case where the partial staking is carried out through the above-described method, an inner peripheral surface of concave formed step portion 26 is always partially left even after the staking is carried out. On the other hand, for actually carried out staking, a stake center ($x_1$, $y_1$) can be determined through the image processing from the arc shape of engagement portion 29 which is a stake locus. Hence, as shown in FIG. 10, a reference center ($x_0$, $y_0$) can be determined from an arc of left concave formed step portion 26 through the image processing. Thus, the calculation of a deviation δ of the stake axle is carried out on the basis of these coordinates ($x_0$, $y_0$) and ($x_1$, $y_1$) and the inferior goods are determined by comparing the deviation of δ with a reference value.

Figure 12A:
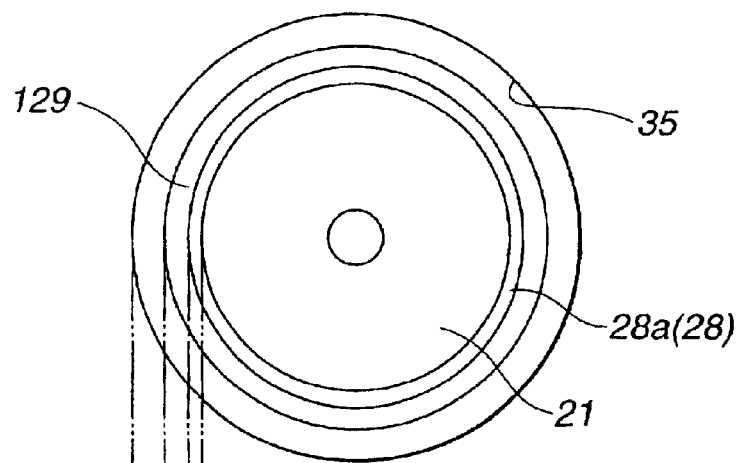
FIGS. 12A and 12B are elevation view and cross section view for explaining a comparative example in the first embodiment.
Figure 12B:
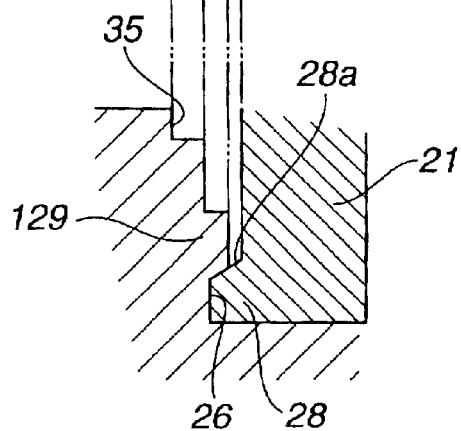
Figure 13:
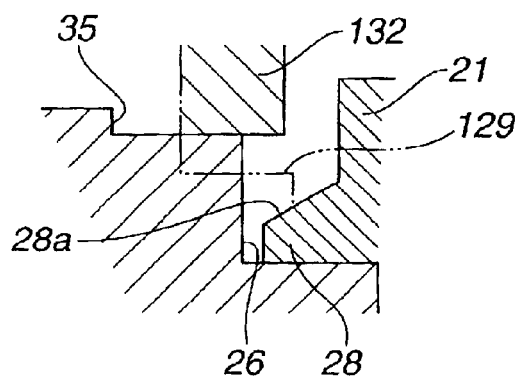
FIG. 13 is a cross sectional view representing the comparative example.

FIGS. 12 and 13 show plan view and cross sectional views when the punch having circular ring shaped pressure applying projections 133 to stake a whole periphery of the upper edge of the concave formed step portion is pressed against the upper edge of concave formed step portion 25. In this comparative case, since the whole area of the upper edge of concave formed step portion 26 is crushed due to the staking so as to form a circular ring shaped engagement portion 129, it is necessary to install additionally a mark purpose circular concave portion 35 over a surrounding area of concave formed step portion 35 in order to obtain the reference center (x0, y0) since the whole upper edge area is squeezed between the concave formed step portion 26 is crushed by means of the staking. It is necessary to add another work to form the mark purpose circular concave portion 35 as compared with the above-described case in which the partial staking is carried out.

In such a liquid pressure control unit as described above, cylindrically shaped holes 18 for respective reservoirs 15 and lid members 21 therefor are basically disposed on the lower surface of base block 11. Each cylindrical wall 27 of corresponding lid member 21 is projected toward an external to base block 11 from its lower surface. Hence, width w of base block 11 can assuredly be narrowed without introduction of an increase in a height of base block 11 in the vertical direction. That is to say, since each cylindrically shaped hole 18 and each lid member 21 are disposed on the same lower surface of base block 11 so that a large axial length of corresponding reservoir 15 does not occupy the width direction of base block 11. In addition, since each cylindrical wall 27 of respective lid members 21 within an internal space of which the corresponding piston 19 does not slide is projected externally to base block 11 so that a depth L (refer to FIG. 3) of cylindrically shaped holes 18 becomes minimum. Hence, a projection (or extension) distance of base block 11 itself toward the lower direction can be reduced.

In addition, in place of disposing each reservoir 145 on the lower surface of base block, width w of base block 11 can be narrowed by disposing each reservoir on another surface than the first and second base surfaces 11a and 11b. As described in the first embodiment, the reservoirs are disposed on the lower surface of base block 11. In this case, a projection area of the whole unit when reviewed from an upper direction becomes small and a mounting ability when the brake liquid pressure control unit is installed within the engine compartment of the vehicle is furthermore improved. Furthermore, in a case where the brake liquid pressure control unit is disposed on one of upper and lower surfaces of base block 11 which is opposite to the surface on which the distribution pipe connecting mouth is arranged, no disadvantage such that lid members 21 projected from base block 11 do not disturb when the distribution pipe is to be connected to the corresponding connecting mouth.

In addition, since, in the first embodiment, each lid member 21 is projected from the same lower surface of base block 11 together with insulator rubber 31 used for attaching base block 11 on the vehicle body, an effective utilization of a space at lower surface side of base block 11 which provides originally a dead space can be made. According to this, a substantial occupying volume of the liquid pressure control unit at a time at which the control unit is mounted on the vehicle can be reduced.

In addition, in the first embodiment, the brake liquid pressure control unit fixes each lid member 21 onto an opening edge of cylindrically shaped holes 18 by means of the partial staking. Hence, a fixing operation itself becomes easy, a structure of the attaching section becomes simple, a reduction in the manufacturing cost, and a further compaction can be achieved as compared with a case wherein such another member as a C ring may be used to fix each lid member since, in the brake pressure control unit in this embodiment, each lid member 21 is fixed onto the opening edge of corresponding cylindrically shaped hole 18 by means of the partial staking.

Furthermore, since a load requiring the staking can be reduced as compared with a case where the staking is performed in a ring form over a whole periphery of corresponding cylindrically shaped hole 18. Hence, the staking can be performed relatively easily even if a pressure applying surface of the punch 32 is made flat. Hence, a punch profile can be simplified and a reduction of tool cost can be achieved. In addition, a life of punch 32 can be extended.

Furthermore, since, in the liquid pressure control unit in the first embodiment, respective lid members 21 are fixed onto the opening edges of corresponding cylindrically shaped holes 18, the partial staking is carried out only at positions except the vicinity regions of the first and second base surfaces 11a and 11b, distortions of both base surfaces 11a and 11b along with the staking can be suppressed to be smaller as denoted by the phantom line of FIG. 5. Hence, width w of base block 11 can be reduced.

Since, in the liquid pressure control unit in the first embodiment, the virtual circle diameter R1 (refer to FIG. 4) formed by the arc of the maximum outer diameter portion of engagement portion 29 is formed to become larger (wider) that width w of base block 11, the staking strength against corresponding lid member 21 can be increased with the sufficient staking margin secured, narrowing width w of base block 11.

Furthermore, in the case of the first embodiment, the end edge in the circumferential direction of each engagement portion 29 is not formed along the radial direction but is formed so that center angle $\alpha_2$ with respect to the arc on a radial direction inner region of the same engagement portion 29 is set to be larger (wider) than the center angle $\alpha_1$ with respect to the arc on the maximum outer diameter portion of each engagement portion 29. Hence, the staking causes a press region to be formed more largely so that a tight fixing to lid members 21 can be assured.

At any rate, in a case where the end edge of each engagement portion 29 is formed to run in parallel to the first and second base surfaces 11a and 11b, the end edges of the pair of engagement portions 29 and 29 are formed to be in a straight line substantially along a tangent line of respectively corresponding cylindrically shaped holes 18 and 18 and the straight line formed by the respective end edges may be tilted by a set angle of θ with respect to the straight line running along each of first and second base surfaces 11a and 11b.

In this embodiment, in order to narrow width w of base block 11, it is not so advantageous than the first embodiment. However, as compared with the staking of the whole periphery of the opening edges of cylindrically formed holes 18 and 18, width w can be narrowed.

Figure 14:
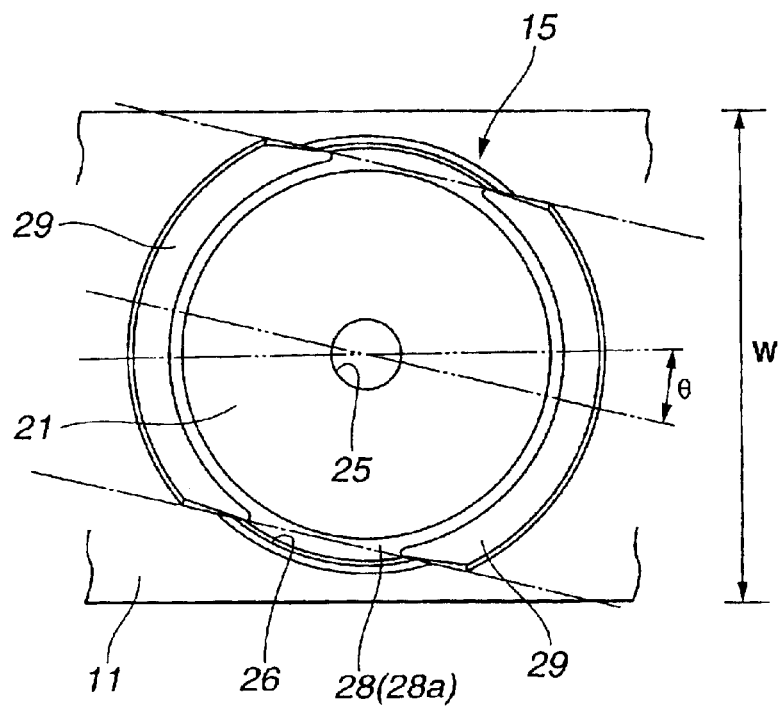
FIG. 14 is a rear surface view of a base block in a second preferred embodiment according to the present invention.
Figure 15:
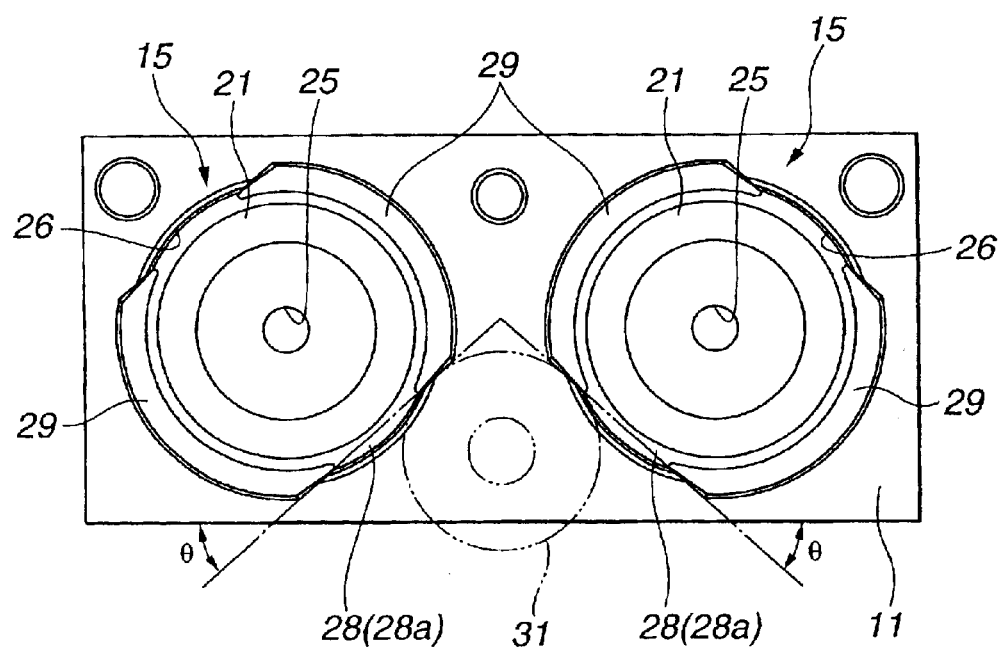
FIG. 15 is a rear surface view of a base block in a third preferred embodiment according to the present invention.

Next, FIG. 14 shows a second preferred embodiment of the brake liquid pressure control unit according to the present invention and FIG. 15 shows a third preferred embodiment of the brake liquid pressure control unit according to the present invention.

In the third embodiment, end edges of the pair of engagement portions 29 and 29 which form respective straight lines, in the same way as in the second embodiment shown in FIG. 4, are tilted with respect to corresponding first and second base surfaces 11a and 11b. The two reservoirs 15 and 15 are aligned on the same single surface of base block 11. The end edges of engagement portions 29 of both of respective reservoirs 15 faced toward non staked portions are tilted through angle θ with respect to the straight line along each of first and second base surface 11a and 11b of base block 11. That is to say, as shown in FIG. 15, the end edges of engagement portions 29 of both reservoirs 15 on which the straight lines run are tilted respectively through set angles of θ to sides on which non-stake region portions are mutually faced (regions on which the engagement portions 29 are not formed). Hence, although, in the third embodiment, the same advantages as those in the second embodiment can basically be obtained, a relatively large triangular area enclosed by two straight lines formed by end edges of engagement portions 29 and 29 of the respective reservoirs 15 and 15 and the straight line running along the second base surface 11b (or first base surface 11a) is secured on a predetermined space between these reservoirs 15 and 15 and second base surface 11b (or first base surface 11a) is secured on a predetermined reservoir attaching surface of base block 11. Consequently, it becomes possible to attach relatively easily a large sized another part such as insulator rubber 31 as described above over such an area as described above.

In each of the first, second, and third embodiment, the pair of engagement portions 29 and 29 are aligned on the opening edges (concave formed step portion 26) of respectively corresponding cylindrically shaped holes 18 and 18. However, as shown in FIG. 16 which shows a fourth preferred embodiment of the brake liquid pressure control unit, each of the pair of engagement portions 29 and 29 may be divided into two pieces (29a, 29b) of engagement portions 29 and 29.

Figure 16:
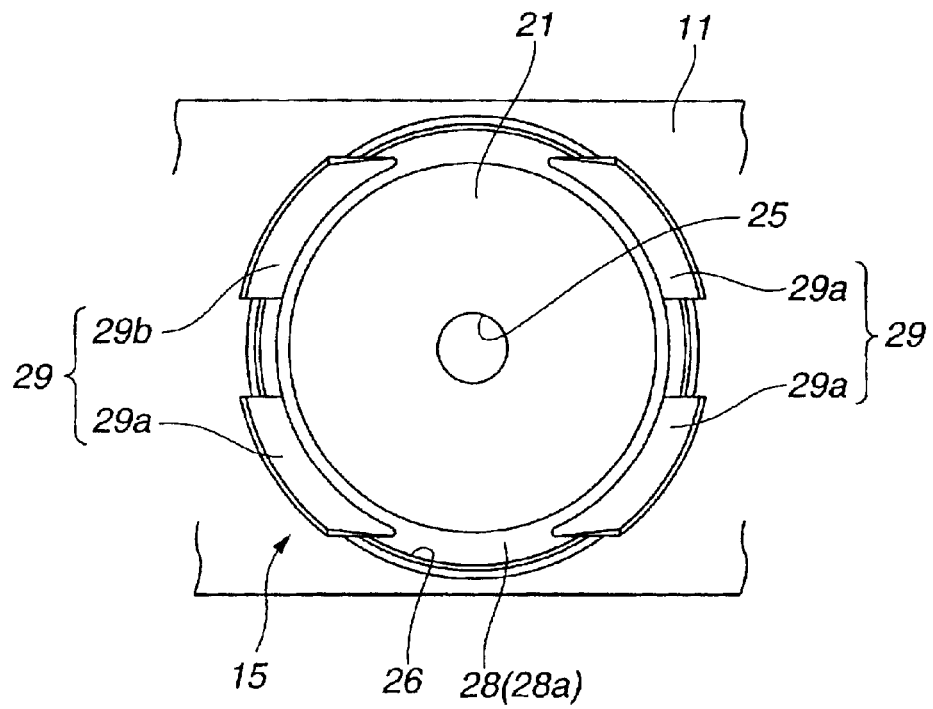
FIG. 16 is a rear surface view of a base block in a fourth preferred embodiment according to the present invention.

As described in the fourth embodiment shown in FIG. 16, the engagement portions 29 are divided (in a case where the number of engagement portions is increased) so that the plastic deformation itself becomes easy and it becomes possible to reduce a stake load to a smaller value.

Figure 17:
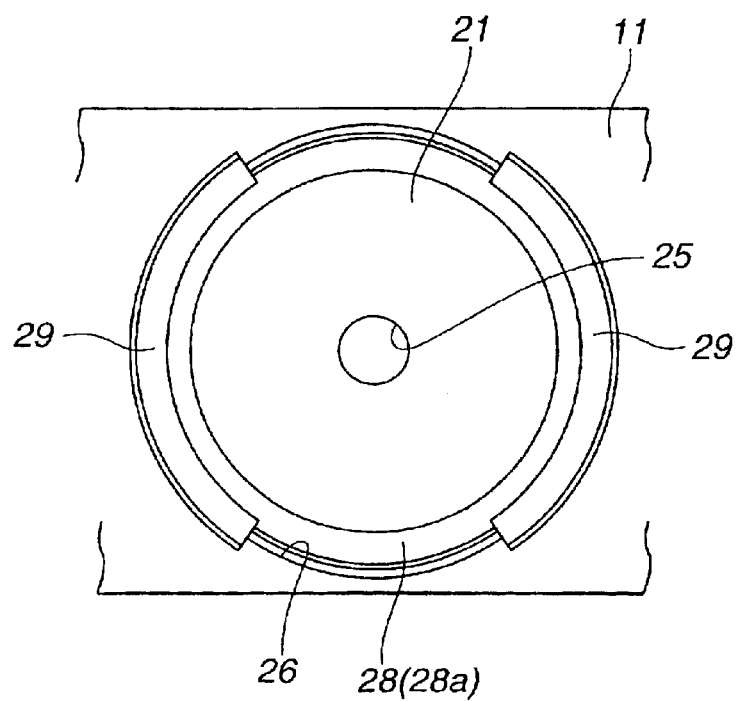
FIG. 17 is a rear surface view of a base block in a fifth preferred embodiment according to the present invention.

FIG. 17 shows a fifth preferred embodiment of the brake liquid pressure control unit according to the present invention.

It is of course that both end edges of each engagement portion 29 may be formed to be in parallel to a radial direction of the corresponding cylindrically shaped hole 18 as described above in the fifth embodiment shown in FIG. 17.

Figure 18:
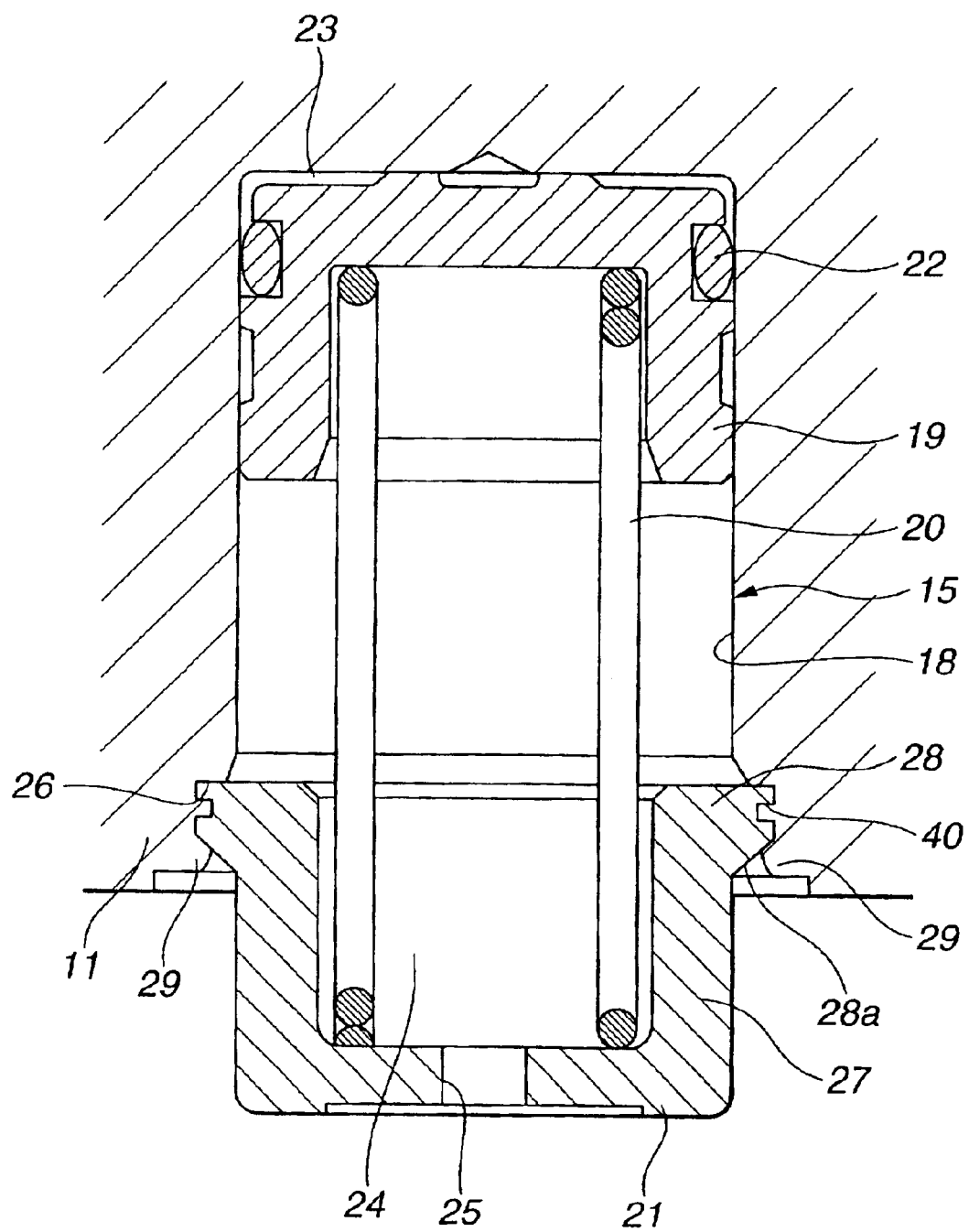
FIG. 18 is a longitudinal cross section view of a reservoir in a sixth preferred embodiment according to the present invention.
Figure 19:
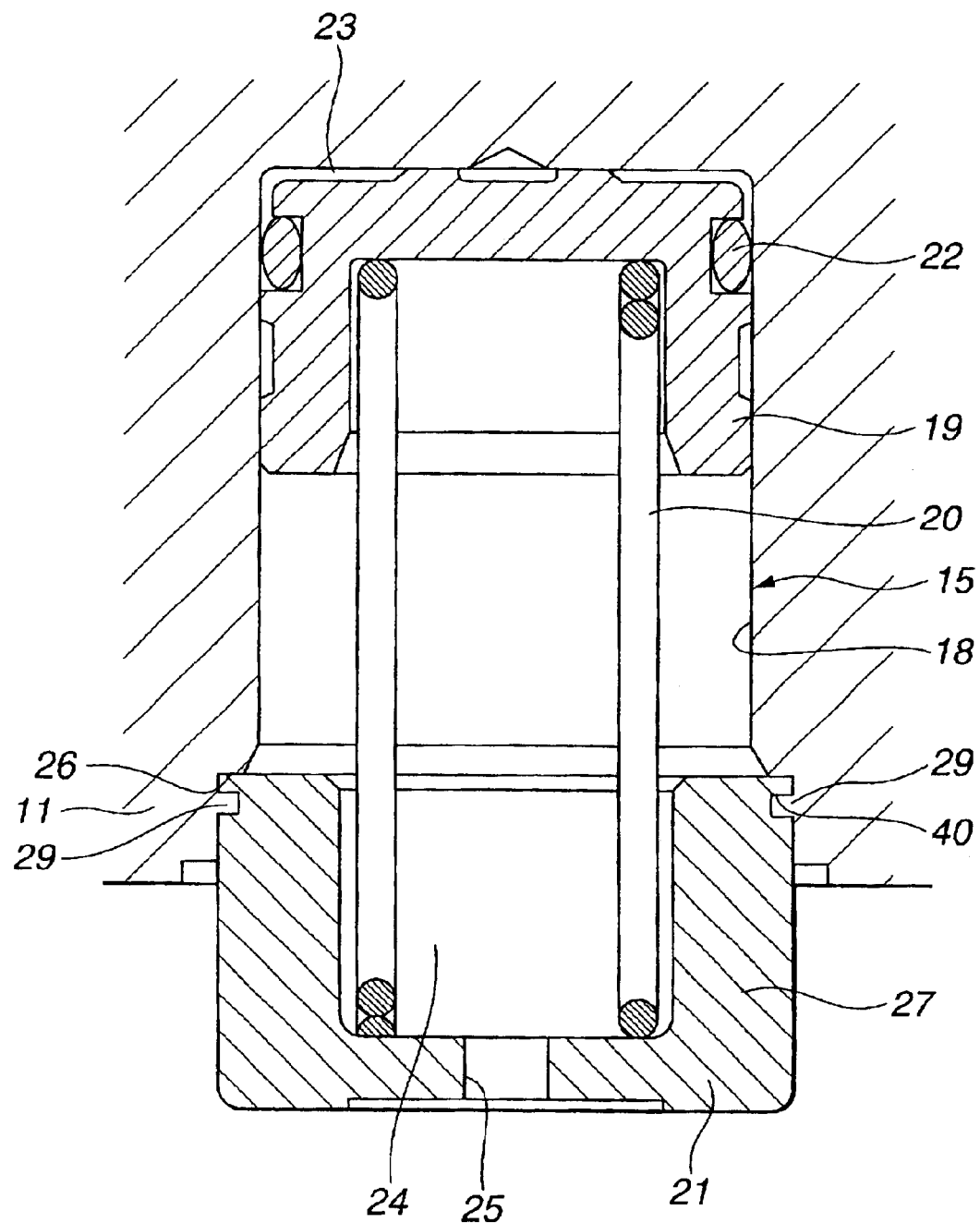
FIG. 19 is a longitudinal cross sectional view of a reservoir in a seventh preferred embodiment according to the present invention.

FIG. 18 shows a sixth preferred embodiment of the brake liquid pressure control unit according to the present invention and FIG. 19 shows a seventh preferred embodiment of the brake liquid pressure control unit according to the present invention.

Although, a basic structure of each reservoir 15 in each of the sixth and seventh embodiments is the same as that described in the first embodiment, a shape of each lid member 21 is different from that described in the first embodiment. It is noted that, the same reference numerals as those described in the first embodiment have the like elements and the description on the reference numerals will be omitted herein.

Although each lid member 21 in the sixth embodiment according to the present invention is the same as those described in the first embodiment in that tapered surface 28a is installed on corresponding flange 28, a ring-shaped groove 40 is formed on an outer periphery of a tip portion of corresponding flange 28 in the sixth embodiment.

When, in the case of the sixth embodiment, the upper edges of concave formed step portions 26 are staked, a material placed in the vicinity to the upper edge is pressed within ring-shaped groove 40 at the same time when the material is pressed over the tapered surface 28a. Hence, in the case of the sixth embodiment, the fixing of each lid member 21 by means of the staking is reinforced more strongly. It is noted that, at this time, it is desirable that the staking by means of which the fixing of each lid member 21 is reinforced more strongly in the partial staking.

On the other hand, each lid member 21 in the seventh embodiment is not provided with such a flange as described in each of the first, second, third, fourth, and fifth embodiments but ring-shaped groove 40 is formed directly on the outer periphery of an end of each corresponding cylindrical wall 27. In the case of this embodiment, if the upper edge of corresponding concave formed step portion 26 is staked, the material placed in the vicinity to the upper edge described above is pressed into ring-shaped groove 40 so that the corresponding lid member 21 is accordingly fixed onto an opening portion of corresponding cylindrically shaped hole 18. It is noted that, since, such a flange as described above is not formed on corresponding lid member 21 can be simplified and its manufacturing cost can be reduced. In this case, the material pressed into ring-shaped groove 40 serves as engagement portion 29. It is desirable that the staking carried out in the seventh embodiment should likewise be the partial staking.

The entire contents of Japanese Patent Applications No. 2001-127591 and 2002-062777 (filed in Japan on Apr. 25, 2001 and Mar. 8, 2002) are herein incorporated by reference. Various modifications and variations can be made without departing from the sprit of the present invention. The scope of the invention is defined with reference to the following claims.

What is claimed is:

1. A brake liquid pressure control unit for an on-vehicle device, comprising:
   a base block in a substantially rectangular parallelopiped comprising four base surfaces;
   at least one reservoir disposed on the base block to temporarily reserve a working liquid in a liquid pressure circuit;
   a motor to operate a pump to supply the working liquid;
   an electronic printed circuit board block to control at least an electromagnetic valve, the motor and electronic printed circuit board block being attached onto mutually opposing first and second base surfaces of the four base surfaces of the base block, respectively;
   a cylindrically shaped hole formed on one of the four base surfaces of the base block except the first and second base surfaces; and
   a lid member constituting the reservoir together with the cylindrically shaped hole, the lid member comprising a substantially cylindrical wall projected externally from the one of the four base surfaces of the base block on which the cylindrically shaped hole is formed and being only partially staked to the one of the four base surfaces of the base block on which the cylindrically shaped hole is formed.

2. A brake liquid pressure control unit for an on-vehicle device as claimed in claim 1, wherein the cylindrically shaped hole and lid member are disposed on at least one of the four base surfaces of the base block which provides at least one of upper and lower surfaces of the base block when the base block is mounted in a vehicle body.

3. A brake liquid pressure control unit for an on-vehicle device as claimed in claim 2, wherein the cylindrically shaped hole and the lid member are disposed on one of the upper and lower base surfaces which is opposite to the base surface on which a distribution tube connection plug is arranged.

4. A brake liquid pressure control unit for an on-vehicle device as claimed in claim 1, further comprising a plurality of approximately arc shaped engagement portions to engageably retain the lid member thereon by partial staking an opening edge of the cylindrically shaped hole along an outer periphery of the lid member.

5. A brake liquid pressure control unit for an on-vehicle device as claimed in claim 4, the engagement portions are disposed on predetermined positions of the base block except surrounding areas of the first and second base surfaces of the base block.

6. A brake liquid pressure control unit for an on-vehicle device as claimed in claim 4, wherein a pair of reservoirs are arranged on one of the base surfaces of the base block, each end edge of mutually adjacent engagement portions of the respective reservoirs is formed to constitute a single straight line approximately along a tangent line direction of the corresponding cylindrically shaped hole, the end edges of both of the engagement portions constituting the straight line are tilted at a set angle (Θ) toward a side at which non staked portions of both of the reservoirs are mutually faced with respect to another straight line along either the first or second base surface.

7. A brake liquid pressure control unit for an on-vehicle device as claimed in claim 3, wherein a pair of reservoirs are aligned on the lower base surface of the base block, with each cylindrical wall of the respective lid members projected externally from the lower base surface of the base block.

8. A brake liquid pressure control unit for an on-vehicle device as claimed in claim 7, wherein each end edge of a pair of approximately arc shaped engagement portions of the base block for the respective lid members formed by the partial staking runs in parallel to each of the first and second base surfaces of the base block.

9. A brake liquid pressure control unit for an on-vehicle device as claimed in claim 7, wherein each virtual straight line is running on each of end edges, of a pair of approximately arc shaped engagement portions of the base block, each end edge being faced in the same direction, and the pair of approximately arc shaped engagement portions of the base block for the respective lid members formed by the partial staking is tilted by a predetermined angle with respect to each of the first and second base surfaces of the base block.

10. A brake liquid pressure control unit for an on-vehicle device as claimed in claim 9, wherein a first one of two virtual straight lines running on each of end edges, each end edge being faced in the same direction, of the pair of the approximately arc shaped engagement portions of the base block for one of the pair of the lid members formed by the partial staking is tilted by the predetermined angle θ and a second one of the two virtual straight lines running on each of end edge, each end edge being faced in the same direction, of the pair of the approximately arc shaped engagement portions of the base block for the other of the pair of the lid members formed by the partial staking is tilted by the predetermined angle θ, the first straight line being intersected to the second straight line and forming a triangular space on the corresponding base surface of the base block together with an end line of either one of the first or second base surface of the base block.

11. A brake liquid pressure control unit for an on-vehicle device as claimed in claim 10, wherein an insulator rubber is attached onto the triangular space of the surface of the base block on which the pair of the reservoirs are formed.

12. A brake liquid pressure control unit for an on-vehicle device as claimed in claim 11, wherein the pair of the approximately arc shaped engagement portions are divided into two pairs of the approximately arc shaped engagement portions.

13. A brake liquid pressure control unit for an on-vehicle device as claimed in claim 11, wherein each end edge is formed along a radial direction of the corresponding one of the cylindrically shaped holes.

14. A brake liquid pressure control unit for an on-vehicle device as claimed in claim 1, wherein the lid member comprises a flange portion with a tapered surface which is extended outwardly from an end of the cylindrical wall in a circular shape and a ring-shaped groove formed on an outer periphery of a tip of the flange portion.

15. A brake liquid pressure control unit for an on-vehicle device as claimed in claim 1, wherein the lid member comprises a ring shaped groove formed on an outer periphery of an end of the cylindrical wall.

16. A brake liquid pressure control unit for an on-vehicle device, comprising:

base block means in a substantially rectangular parallelepiped comprising four base surfaces;

working liquid reserving means disposed on the base block for temporarily reserving a working liquid in a liquid pressure circuit;

operating means for operating a pump to supply the working liquid:

electronic printed circuit board block means for controlling at least an electromagnetic valve, the operating means and electronic printed circuit board block means being attached onto mutually opposing first and second base surfaces of the base block means, respectively;

cylindrically shaped hole means formed on one of the four base surfaces of the base block means except the first and second base surfaces; and lid member means constituting the reserving means together with the cylindrically shaped hole means, the lid member means comprising a cylindrical wall projected externally from the one of the four base surfaces of the base block on which the cylindrically shaped hole means and being only partially staked to the one of the four base surfaces of the base block on which the cylindrical shaped hole means is formed.

17. A brake liquid pressure control unit for an on-vehicle device, comprising:

a base block in a substantially rectangular parallelepiped comprising four base surfaces;

at least one reservoir disposed on the base block to temporarily reserve a working liquid in a liquid pressure circuit;

a motor to operate a pump to supply the working liquid:

an electronic printed circuit board block to control at least an electromagnetic valve, the motor and electronic printed circuit board block being attached onto mutually opposing first and second base surfaces of the four base surfaces of the base block, respectively;

a cylindrically shaped hole formed on one of the four base surfaces of the base block except the first and second base surfaces;

a lid member constituting the reservoir together with the cylindrically shaped hole, the lid member comprising a substantially cylindrical wall projected externally from the one of the four base surfaces of the base block on which the cylindrically shaped hole is formed; and a plurality of approximately arc shaped engagement portions to engageably retain the lid member thereon by performing a partial staking for an opening edge of the cylindrically shaped hole along an outer periphery of the lid member, the engagement portions being disposed on predetermined positions of the base block except surrounding areas of the first and second base surfaces of the base block and a diameter of a virtual circle formed by an arc of each engagement portion being set to be larger than a width between of the first and second base surfaces of the base block.

18. A brake liquid pressure control unit for an on-vehicle device, comprising:

a base block in a substantially rectangular parallelepiped comprising four base surfaces;

at least one reservoir disposed on the base block to temporarily reserve a working liquid in a liquid pressure circuit;

a motor to operate a pump to supply the working liquid:
an electronic printed circuit board block to control at least an electromagnetic valve, the motor and electronic printed circuit board block being attached onto mutually opposing first and second base surfaces of the four base surfaces of the base block, respectively;
a cylindrically shaped hole formed on one of the four base surfaces of the base block except the first and second base surfaces;
a lid member constituting the reservoir together with the cylindrically shaped hole, the lid member comprising a substantially cylindrical wall projected externally from the one of the four base surfaces of the base block on which the cylindrically shaped hole is formed; and
a plurality of approximately arc shaped engagement portions to engageably retain the lid member thereon by performing a partial staking for an opening edge of the cylindrically shaped hole along an outer periphery of the lid member, each end edge of the respective arc shaped engagement portions being formed in such a manner that a central angle with respect to a first arc placed at a radially inner region of each engagement portion is set to be wider than another center angle with respect to a second arc placed at a radially maximum outer portion of the same engagement portion.

19. A brake liquid pressure control unit for an on-vehicle device as claimed in claim 1, wherein the cylindrically shaped hole and the lid member constituting the reservoir are disposed on the one of the four base surfaces of the base block which provides a lower surface of the base block when the base block is mounted in a vehicle body.

20. A brake liquid pressure control unit for an on-vehicle device as claimed in claim 19, wherein engagement portions are disposed on predetermined positions of the base block except surrounding areas of the first and second base surfaces of the base block.

21. A brake liquid pressure control unit for an on-vehicle device, comprising:
a base block in a substantially rectangular parallelepiped comprising four base surfaces;
at least one reservoir disposed on the base block to temporarily reserve a working liquid in a liquid pressure circuit;
a motor to operate a pump to supply the working liquid;
an electronic printed circuit board block to control at least an electromagnetic valve, the motor and electronic printed circuit board block being attached onto mutually opposing first and second base surfaces of the base block, respectively;
a cylindrically shaped hole formed on one of the four base surfaces of the base block except the first and second base surfaces;
a lid member constituting the reservoir together with the cylindrically shaped hole, the lid member comprising a substantially cylindrical wall projected externally from the one of the four base surfaces of the base block on which the cylindrically shaped hole is formed and being only partially staked to the one of the four base surfaces of the base block on which the cylindrically shared hole is formed, wherein the cylindrically shaped hole and the lid member constituting the reservoir being disposed on the one of the four base surfaces of the base block which provides a lower surface of the base block when the base block is mounted in a vehicle body; and
a plurality of approximately arc shaped engagement portions that engageably retain the lid member thereon by performing a partial staking for an opening edge of the cylindrically shaped hole along an outer periphery of the lid member.

22. A brake liquid pressure control unit for an on-vehicle device, comprising:
a base block in a substantially rectangular parallelepiped comprising four base surfaces;
at least one reservoir disposed on the base block to temporarily reserve a working liquid in a liquid pressure circuit;
a motor to operate a pump to supply the working liquid;
an electronic printed circuit board block to control at least an electromagnetic valve, the motor and electronic printed circuit board block being attached onto mutually opposing first and second base surfaces of the base block, respectively;
a cylindrically shaped hole formed on one of the four base surfaces of the base block except the first and second base surfaces;
a lid member that forms the reservoir together with the cylindrically shaped hole, the lid member comprising a substantially cylindrical wall projected externally from the one of the four base surfaces of the base block on which the cylindrically shaped hole is formed; and
at least two separate engagement portions formed along a periphery of the cylindrically shaped hole, the engagement portions partially staking the lid member to the base surface on which the cylindrically shaped hole is formed.

23. A brake liquid pressure control unit for an on-vehicle device, comprising:
a base block in a substantially rectangular parallelopiped comprising four base surfaces;
at least one reservoir disposed on the base block to temporarily reserve a working liquid in a liquid pressure circuit;
a motor to operate a pump to supply the working liquid;
an electronic printed circuit board block to control at least an electromagnetic valve, the motor and electronic printed circuit board block being attached onto mutually opposing first and second base surfaces of the four base surfaces of the base block, respectively;
a cylindrically shaped hole formed on one of the four base surfaces of the base block except the first and second base surfaces; and
a lid member constituting the reservoir together with the cylindrically shaped hole, the lid member comprising a substantially cylindrical wall projected externally from the one of the four base surfaces of the base block on which the cylindrically shaped hole is formed and being only partially staked to the one of the four base surfaces of the base block on which the cylindrically shaped hole is formed,
wherein the base block comprises engagement portions along a periphery of the cylindrically shaped hole that engage a flange along an outer periphery of the lid member to partially stake the lid member to the base block.

24. The brake liquid pressure control unit as claimed in claim 23, wherein no engagement portions are formed along a periphery of the cylindrically shaped hole proximate to the first and second base surfaces of the base block.

25. The brake liquid pressure control unit as claimed in claim 1, wherein the lid member further comprises a bottom end portion formed in an inverted bell shape.

26. The brake pressure liquid control unit according to claim 16, wherein the lid member means further comprises a bottom end portion formed in a substantially inverted bell shape.

27. The brake liquid pressure control unit according to claim 21, wherein the lid member further comprises a bottom end portion formed in a substantially inverted bell shape.

28. The brake liquid pressure control unit as claimed in claim 22, wherein the lid member further comprises a bottom end portion formed in an inverted bell shape.

29. The brake liquid pressure control unit as claimed in claim 23, wherein the lid member further comprises a bottom end portion formed in an inverted bell shape.

* * * * *